(12) United States Patent
Chen et al.

(10) Patent No.: US 10,812,539 B2
(45) Date of Patent: Oct. 20, 2020

(54) ENHANCED GROUP COMMUNICATIONS WITH EXTERNAL PARTICIPANTS

(71) Applicant: International Business Machines Corporation, Armonk, NY (US)

(72) Inventors: Ye Qing Chen, Shanghai (CN); Xin Qe Feng, Shanghai (CN); Hua Jun Long, Shanghai (CN); Juan Rao, Shanghai (CN); Jian Jun Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 15/618,948

(22) Filed: Jun. 9, 2017

(65) Prior Publication Data
US 2018/0359292 A1 Dec. 13, 2018

(51) Int. Cl.
  *H04L 29/06* (2006.01)
  *G06F 17/27* (2006.01)
  *H04L 12/18* (2006.01)
  *G06F 40/30* (2020.01)
  *G06F 3/0482* (2013.01)
  *H04L 29/08* (2006.01)
  *H04L 12/58* (2006.01)

(52) U.S. Cl.
  CPC .......... *H04L 65/1093* (2013.01); *G06F 40/30* (2020.01); *H04L 12/1822* (2013.01); *H04L 65/403* (2013.01); *G06F 3/0482* (2013.01); *H04L 51/046* (2013.01); *H04L 51/16* (2013.01); *H04L 67/306* (2013.01); *H04L 67/42* (2013.01)

(58) Field of Classification Search
  CPC ............. H04L 65/1093; H04L 12/1822; H04L 51/046; H04L 51/16; H04L 65/403; H04L 67/306; H04L 67/42; G06F 17/2785; G06F 3/0482
  See application file for complete search history.

(56) References Cited

U.S. PATENT DOCUMENTS

| | | | |
|---|---|---|---|
| 2005/0050143 A1 | 3/2005 | Gusler et al. | |
| 2005/0054381 A1* | 3/2005 | Lee | G06F 3/011 |
| | | | 455/557 |
| 2005/0149621 A1 | 7/2005 | Kirkland et al. | |

(Continued)

OTHER PUBLICATIONS citrixonline.com "Send Chat Messages (Desktop App)," http://support.citrixonline.com/en_US/webinar/all_files/G2W040017 [Accessed Online May 31, 2017].

*Primary Examiner* — Tan H Tran
(74) *Attorney, Agent, or Firm* — Patterson + Sheridan, LLP

(57) ABSTRACT

Systems, methods, and computer program products to perform an operation comprising identifying, in a first group chat comprising a plurality of messages, an indication to add an external user in a text of a first message of the plurality of messages, wherein a membership of the first group chat comprises a plurality of users exclusive of the external user, responsive to receiving a second message from the external user via a first graphical user interface (GUI), outputting the second message to each of the plurality of users of the first group chat, and responsive to receiving a third message from one of the plurality of members of the first group chat via a second GUI, outputting the third message to the external user and each of the plurality of users of the first group chat.

20 Claims, 10 Drawing Sheets

(56) References Cited

U.S. PATENT DOCUMENTS

| | | | |
|---|---|---|---|
| 2007/0288560 A1* | 12/2007 | Bou-Ghannam | G06Q 10/107 709/204 |
| 2008/0034040 A1* | 2/2008 | Wherry | G06Q 10/107 709/204 |
| 2008/0189623 A1 | 8/2008 | Patil | |
| 2009/0119371 A1 | 5/2009 | Chang et al. | |
| 2010/0005402 A1* | 1/2010 | George | H04L 51/04 715/758 |
| 2011/0231499 A1* | 9/2011 | Stovicek | H04L 51/22 709/206 |
| 2012/0331397 A1* | 12/2012 | Eidelson | G06Q 10/107 715/751 |
| 2013/0262574 A1* | 10/2013 | Cohen | G06F 17/2765 709/204 |
| 2015/0350258 A1* | 12/2015 | Griffin | H04L 65/1093 348/14.08 |
| 2017/0288904 A1* | 10/2017 | Chaturvedi | H04L 12/4625 |
| 2017/0310717 A1* | 10/2017 | Staples | H04L 51/04 |
| 2018/0069906 A1* | 3/2018 | Yang | H04L 65/1069 |
| 2018/0232354 A1* | 8/2018 | Dunne | G06F 17/279 |
| 2018/0253659 A1* | 9/2018 | Lee | G06N 99/005 |

* cited by examiner

THREADS

- WORK
- CHESS CLUB
- FAMILY
- CARS
- VACATION
- WIFE
- SON

201

USER A: WE NEED TO FIX THE LATEST PERFORMANCE ISSUE IN THE SOFTWARE.
USER B: I THINK THE PROBLEM IS RELATED TO THE NEW FEATURE WE JUST ADDED.
USER C: TYLER WAS THE TEAM LEAD ON THE NEW FEATURE. MAYBE HE CAN HELP US SOLVE THE PROBLEM?

203 — [ TYPE MESSAGE HERE, PRESS ENTER TO SUBMIT.... ]

THREADS

- WORK
- CHESS CLUB
- FAMILY
- CARS
- VACATION
- WIFE
- SON

USER A: WE NEED TO FIX THE LATEST PERFORMANCE ISSUE IN THE SOFTWARE.
USER B: I THINK THE PROBLEM IS RELATED TO THE NEW FEATURE WE JUST ADDED.
USER C: TYLER WAS THE TEAM LEAD ON THE NEW FEATURE. MAYBE HE CAN HELP US SOLVE THE PROBLEM?
USER A: HI TYLER, WE'RE HAVING A PROBLEM WITH THE NEW FEATURE.
TYLER123: HEY GUYS, I CAN HELP.
USER B: GREAT, FINALLY.
USER A: THANKS TYLER.
TYLER123: I THINK THE ISSUE IS RELATED TO A MEMORY LEAK
USER B: TYLER? WHAT IS CAUSING THE MEMORY LEAK?
USER A: YES, FINALLY.
TYLER123: I'LL SCAN THE SOURCE CODE.
USER A: OK, LET US KNOW!

TYPE MESSAGE HERE, PRESS ENTER TO SUBMIT... — 203

202

201

200

CHATTING WITH MEMBERS OF WORK  X

USER A: HI TYLER, WE'RE HAVING A PROBLEM WITH THE NEW FEATURE.
TYLER123: HEY GUYS, I CAN HELP.
USER A: THANKS TYLER.
TYLER123: I THINK THE ISSUE IS RELATED TO A MEMORY LEAK.
USER B: TYLER, WHAT IS CAUSING THE MEMORY LEAK?
TYLER123: I'LL SCAN THE SOURCE CODE
USER A: OK LET US KNOW!

ENHANCED GROUP COMMUNICATIONS WITH EXTERNAL PARTICIPANTS

BACKGROUND

The present disclosure relates to computer software, and more specifically, to enhanced group communications with external participants.

Modern communications applications allow multiple users to communicate in a common communication space, commonly referred to as a "group chat". However, management of group chats is often difficult. For example, creators of a group chat often forget to add an intended user. As another example, the group membership may be formed accurately, but the group chat may require input from an external participant for a limited time and/or topic of conversation. Simply adding the external participant to the group chat is undesirable, as it may be embarrassing to remove the external participant once the limited time has expired, or the limited topic of conversation has completed.

SUMMARY

According to one embodiment of the present disclosure, a method comprises identifying, in a first group chat comprising a plurality of messages, an indication to add an external user in a text of a first message of the plurality of messages, wherein a membership of the first group chat comprises a plurality of users exclusive of the external user, responsive to receiving a second message from the external user via a first graphical user interface (GUI), outputting the second message to each of the plurality of users of the first group chat, and responsive to receiving a third message from one of the plurality of members of the first group chat via a second GUI, outputting the third message to the external user and each of the plurality of users of the first group chat.

In another embodiment, a system comprises a processor and a memory storing instructions, which when executed by the processor, performs an operation comprising identifying, in a first group chat comprising a plurality of messages, an indication to add an external user in a text of a first message of the plurality of messages, wherein a membership of the first group chat comprises a plurality of users exclusive of the external user, responsive to receiving a second message from the external user via a first graphical user interface (GUI), outputting the second message to each of the plurality of users of the first group chat, and responsive to receiving a third message from one of the plurality of members of the first group chat via a second GUI, outputting the third message to the external user and each of the plurality of users of the first group chat.

In another embodiment, a computer-readable storage medium has computer-readable program code embodied therewith, the computer-readable program code executable by a processor to perform an operation comprising identifying, in a first group chat comprising a plurality of messages, an indication to add an external user in a text of a first message of the plurality of messages, wherein a membership of the first group chat comprises a plurality of users exclusive of the external user, responsive to receiving a second message from the external user via a first graphical user interface (GUI), outputting the second message to each of the plurality of users of the first group chat, and responsive to receiving a third message from one of the plurality of members of the first group chat via a second GUI, outputting the third message to the external user and each of the plurality of users of the first group chat.

BRIEF DESCRIPTION OF THE SEVERAL VIEWS OF THE DRAWINGS

FIG. 2A-2F illustrate examples of enhanced group communications with external participants, according to various embodiments.

DETAILED DESCRIPTION

Embodiments disclosed herein provide techniques for dynamic, enhanced group communications between members of a group chat and one or more external participants. Generally, embodiments disclosed herein perform semantic analysis of the text in the group chat to identify an indication that the group needs to communicate with an external participant. For example, the semantic analysis may identify the phrase "let's ask user X for her opinion" as an indication that the group needs to communicate with user X. In response, a communication channel is established between the group chat and user X. Embodiments disclosed herein then provide a modified user interface for the group chat which includes at least two different input areas. The at least two different input areas differ in that messages sent via a first input area is received only by members of the group chat, while messages sent via a second input area are received by members of the group chat and the external user (e.g., user X). Furthermore, the external user is presented a user interface which displays messages sent by the group chat members via the second input area, and allows users to input messages which are outputted in the group chat window.

Figure 1:
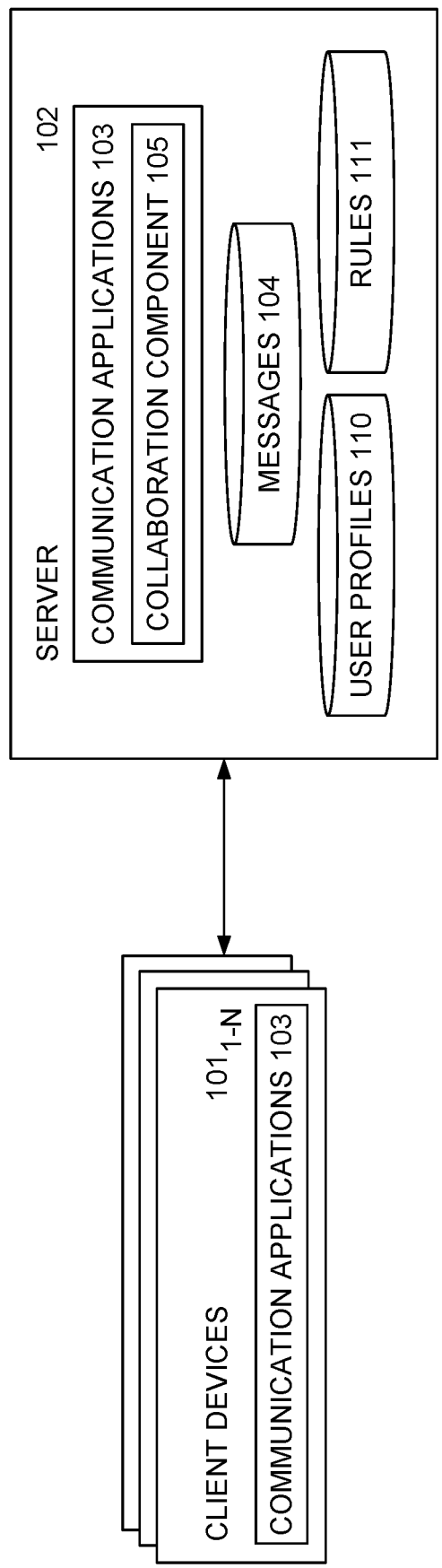
FIG. 1 illustrates an example system architecture which provides enhanced group communications with external participants, according to one embodiment.

FIG. 1 illustrates an example system architecture 100 which provides enhanced group communications with external participants, according to one embodiment. As shown, the system includes a plurality of client devices 101$_{1-N}$ and a server 102. As shown, the client devices 101$_{1-N}$ include a plurality of communication applications 103. The communication applications 103 are representative of any type of application which allows users communicate via text that is organized into threads (or groups, windows, etc.), such as email clients, chat rooms, forums, meeting rooms, and the like. Furthermore, the communication applications 103 include web browsers which expose similar functionality (e.g., web-based email clients, chat rooms, forums, etc.). In addition to text, the users of the communication applications 103 may further communicate via voice messages, images, videos, and any other type of objects.

As shown, the server 102 includes instances of the communication applications 103, which includes a collaboration component 105. The collaboration component 105 is generally configured to manage communications between multiple users (collectively referred to herein as a "group chat")

of the communications applications 103 and one or more users of the communications applications 103 that are not members of the multi-user group chat. In some embodiments, the instances of the communications applications 103 on the client devices 101$_{1-N}$ include the collaboration component 105. In at least one embodiment, the collaboration component is external to each communication application 103. In at least one embodiment, the collaboration component 105 leverages cognitive computing to determine when the text of a group chat suggests that communication with an external user is desired (e.g., identifying phrases such as "we should ask . . . "). In at least one embodiment, the collaboration component 105 is configured to identify a question and the name of a user that is not a member of the group chat to determine that communication with an external user is desired (e.g., "I don't know the answer, let's ask user Y."). However, in other embodiments, a user may manually specify to engage an external user with a group chat (e.g., via a GUI provided by the collaboration component 105 and/or communication application 103). The collaboration component 105 may then notify the external user that one or more of the members of the group chat wish to communicate with the external user. The collaboration component 105 may then establish communications between the external user and the group chat, e.g., by associating messages sent by the external user with the group chat in the messages 104. In at least one embodiment, the collaboration component 105 receives approval from the external user before establishing communications with the group chat.

In at least one embodiment, the collaboration component 105 modifies the graphical user interface (GUI) of the group chat to include two or more input areas. When input is provided to a first one of the input areas, the input is only provided to members of the group chat, and not the external user. When input is provided to a second one of the input areas, the input is provided to the members of the group chat and the external user. When the external user sends messages to the group chat, the messages are viewable by the external user and the members of the group chat. In at least one embodiment, the GUI of the group chat also allows the users to end the communication session with the external user. Similarly, the external user is able to end the communication session with the group chat at any time.

Furthermore, the collaboration component 105 leverages cognitive computing to determine when a group chat has concluded communications with an external user (e.g., when a user of the group chat sends a message 104 including "thank you for your help", "talk to you later", etc.). In response, the collaboration component 105 may end the communication session between the group chat and the external user. Further still, the collaboration component 105, over time, learns phrases that users typically use to indicate that communication with an external user is desired, and uses these learned phrases to automatically determine to engage an external user of a group chat with a high level of confidence. Similarly, the collaboration component 105 may learn phrases that indicate that communications between the group chat and the external user have completed, and use these learned phrases to automatically end the communication session between the group chat and the external user with a high level of confidence.

As shown, the server 102 further includes data stores for messages 104, user profiles 110, and rules 111. The messages 104 store the text, images, and any other objects contributed by the users of the communication applications 103. Although depicted as a common data store, in some embodiments, each respective communication application 103 has its own instance of the messages 104. Generally, for a given communication application 103 the messages that make up a single thread of discussion (e.g., a group chat) share a relationship based on a common identifier (e.g., a universally unique identifier (UUID)). For example, an email chain sent between multiple users share the same UUID, allowing an email client instance of a communication application 103 to display the email chain as a single thread. When a communications session between a group chat and an external user is initiated, the messages sent by members of the group chat only to the other members of the group chat may retain the UUID of the original group chat. However, a new UUID may be assigned for communications between the group chat and the external user. In such embodiments, the messages sent by the external user to the group chat are labeled with the new UUID, and messages sent by members of the group chat to the external user and other members of the group chat are labeled with the new UUID.

The user profiles 110 include user profiles for a plurality of users of each communication application 103. A given user profile 110 generally includes metadata describing the user and user preferences. The user profiles 110 may further include style preferences (e.g. fonts, font sizes, font effects), external communication preferences (e.g., open external communications in a new tab, window, panel, etc.), and the like. The rules 111 are representative of rules leveraged by the collaboration component 105 and/or the communication applications 103. For example, the rules may include default formatting rules, words and/or phrases identified by the collaboration component 105 as including a question and a need to communicate with an external user, and phrases marking the end of a conversation (e.g., between the external user and the group chat), and the like.

FIG. 2A illustrates examples graphical user interface 200 which provides enhanced group communications with external participants, according to one embodiment. As shown, the GUI 200 includes a threads panel 201 and a messages panel 202. The threads panel 201 lists a plurality of different threads of discussion (e.g., work, family, cars), each of which are associated with one or more messages in the messages 104. The messages panel 202 outputs the messages from the messages 104 that are associated with a given thread in the threads 201. As shown, a user has selected the "work" thread, which is a group chat having a plurality of members from the threads panel 201. As such, the messages panel 202 depicts a plurality of messages from the messages 204, e.g., messages submitted by a plurality of different users via a submission box 203 of the GUI 200.

As shown, the users of the group chat are discussing a performance issue in a piece of software. However, the users have determined that the expertise of an additional user, "Tyler", who is not a member of the group chat, is needed to resolve the performance issue. As previously indicated, the collaboration component 105 performs semantic analysis of the text of the messages submitted by the users to determine that members of a group chat need to communicate with an external user. For example, the collaboration component 105 may use natural language classifiers to identify questions, concepts, topics, and/or intent to communicate with an external user in the messages 104. Similarly, the logic layer 106 may identify keywords and/or punctuation that indicate questions, topics, concepts, and intent. In the example depicted in FIG. 2A, the collaboration component 105 identifies a new user "Tyler" that is not a member of the group chat, and a question "maybe he can help us solve the problem", and determines that the members of the group chat need to communicate with the external user Tyler.

Figure 2B:
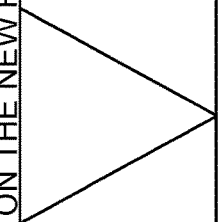

FIG. 2B the GUI 200 with a popup window 210 generated by the collaboration component 105 after determining the users of the group chat wish to communicate with Tyler, who is not a member of the "work" group chat. As shown, the window 210 lists three example usernames "Tyler123", "TylerABC", and "TylerXYZ". In one embodiment, the example usernames are selected based on contact data stored in the user profiles 110 of the members of the group chat (e.g., contacts who have a first, middle, last, or username that is like "Tyler"). The user may then select one or more of the example usernames. In the example depicted in FIG. 2B, the user selects and submits the example username "Tyler123".

Figure 2C:
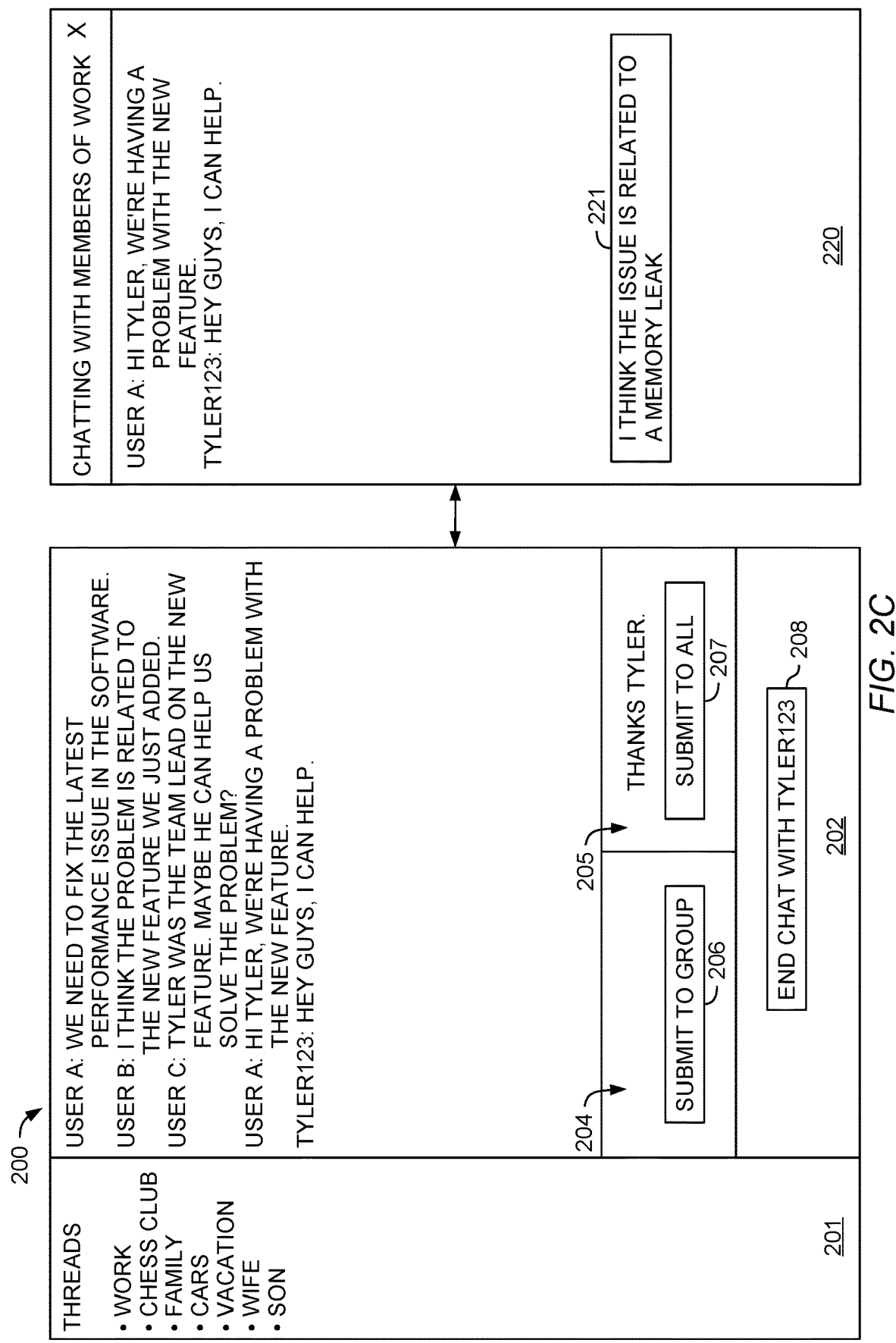

FIG. 2C depicts the GUI 200 after the user selected and submitted the example username of "Tyler123" in the window 210. FIG. 2C also depicts a new GUI 220 that is generated for the user "Tyler123. The GUIs 200, 220 are outputted on different user devices $101_{1-N}$, e.g., a user device $101_1$ used by the user "Tyler123", and a respective user device $101_{2-N}$ used by the members of the group chat. As shown, the messages window 202 of the GUI 200 now includes two new input areas 204, 205. Generally, the input area 204 is configured to receive text and other input which, when submitted (e.g., via the submit button 206), is displayed in the group chat window 202 (e.g., to the members of the group chat), but not displayed in the GUI 220 (e.g., Tyler123 cannot view). The input area 205 is configured to receive text and other input which, when submitted (e.g., via the submit button 207) is displayed in the group chat window 202, and the GUI 220. As shown, the GUI 200 also includes a button 208 that allows any member of the group chat to end the external communication with Tyler123.

The GUI 220 is a chat window generated for the user external to the group chat, in this example, the user Tyler123. As shown, the GUI 220 includes a message from "UserA", and a message submitted by Tyler123. Similarly, the messages panel 202 of the GUI 200 also includes the message from "UserA" and the message from user "Tyler123". The GUI 220 also includes an input box 221 that allows the user Tyler123 to submit messages that are stored in the messages 104, and outputted in the GUI 220 and the messages panel 220 of the GUI 200.

Figure 2D:
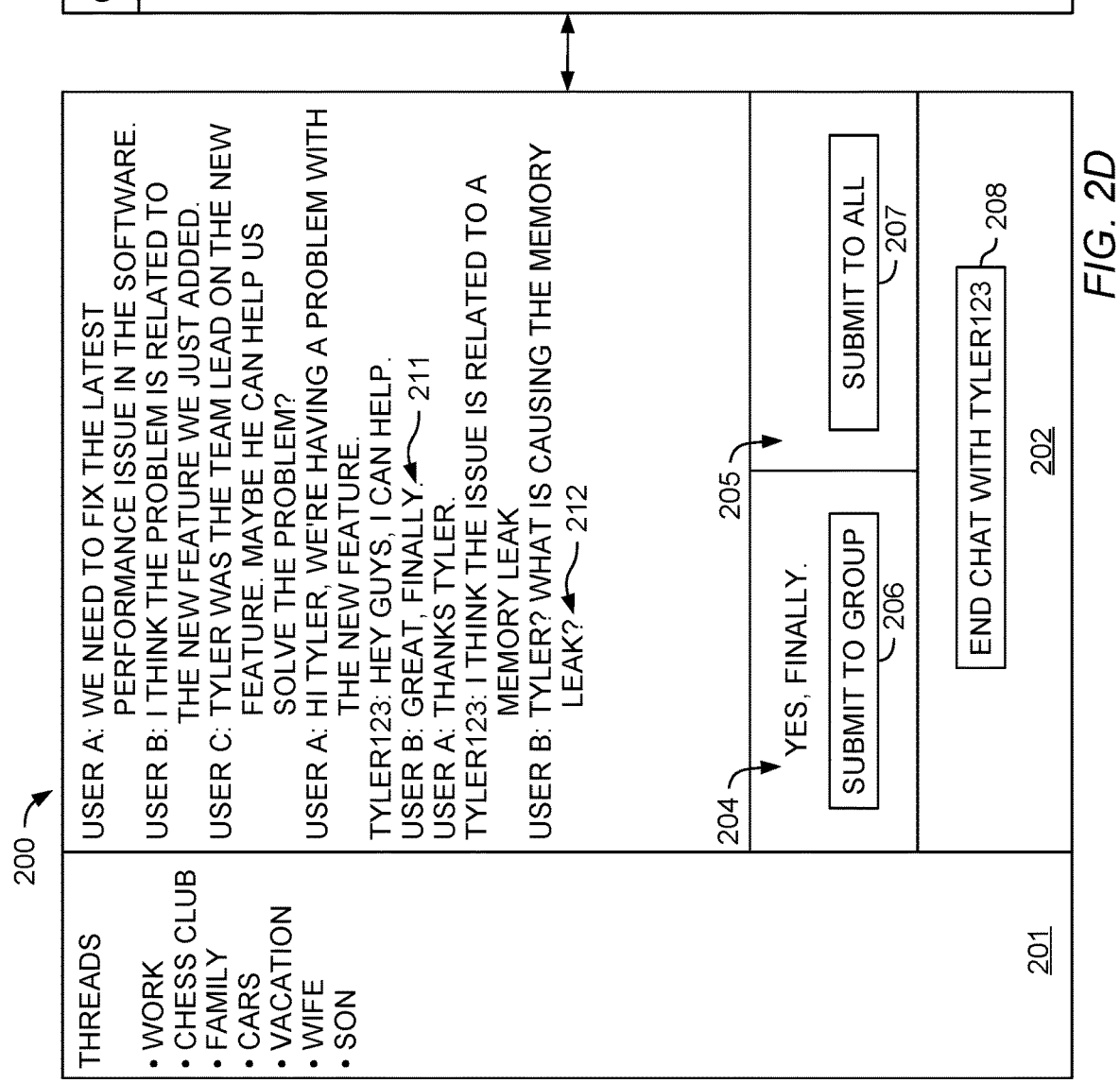

FIG. 2D depicts the GUIs 200, 220 during the communication between the group chat and the external user Tyler123. As shown, the messages 104 depicted in the GUIs 200, 220 differ in that the messages panel 202 includes a message 211 from "UserB" that is not displayed in the GUI 220, and is therefore not viewable by user "Tyler123". This is because "UserB" submitted the message 211 via the input area 204, which submits messages to the group chat, but not to external users. However, the GUIs 200, 220 each display a message 212, which was submitted by "UserB" via the input area 205, which submits messages to the group chat and any other external users (e.g., user "Tyler123").

Figure 2E:
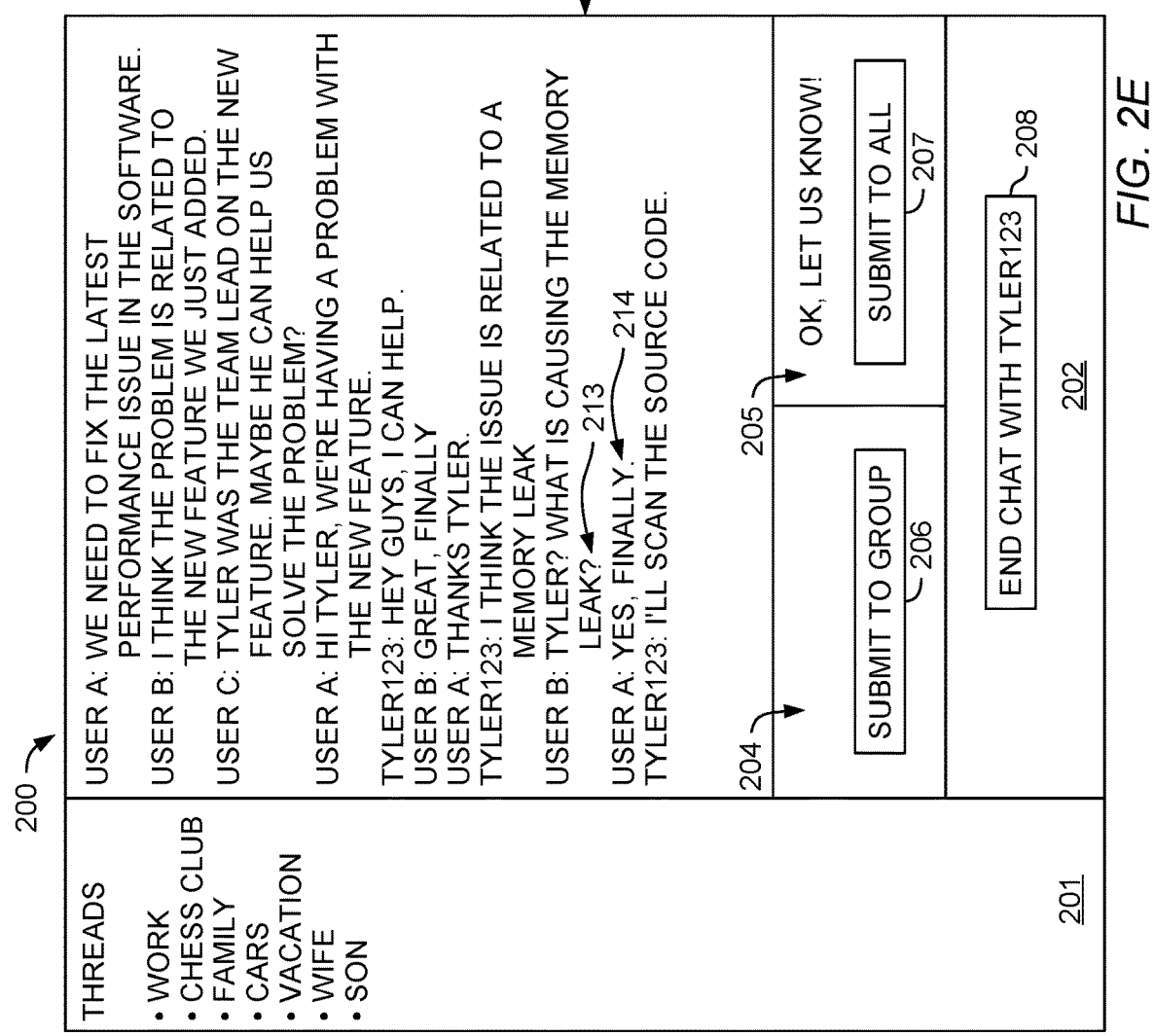

FIG. 2E depicts the GUIs 200, 220 during the communication between the group chat and the external user Tyler123. As shown, the messages 104 depicted in the GUIs 200, 220 differ in that the messages panel 202 includes a message 214 from "UserA" that is not displayed in the GUI 220, and is therefore not viewable by user "Tyler123". This is because "UserA" submitted the message 214 via the input area 204, which submits messages to the group chat, but not to external users. However, the GUIs 200, 220 each display a message 213, which was submitted by "UserB" via the input area 205, which submits messages to the group chat and any other external users (e.g., user "Tyler123").

As previously indicated, the collaboration component 105 is configured to dynamically determine when communications between the members of the group chat and external users has completed. For example, as shown in FIG. 2E, the input area 205 includes a message stating "Ok, let us know!" The collaboration component 105 may determine that this message is the conclusion of the conversation between the members of the group chat and user "Tyler123". In response, the collaboration component 105 may end the communication session. However, as previously indicated, the users of the group chat may end the communication session manually by selecting the button 208.

FIG. 2F depicts the GUIs 200, 220 after the collaboration component 105 has determined to end the communication session between the members of the group chat and the external user "Tyler123". As shown, the input areas 204, 205 and submit buttons 206-207 no longer appear in the message panel 202. Furthermore, the GUI 220 no longer includes the input box 221, meaning the user "Tyler123" can no longer chat with the members of the group chat.

Furthermore, the collaboration component 105 may allow multiple external users to communicate with a group chat. For example, returning to FIG. 2B, the user may select each of the three users depicted in the window 210. Each selected user would be presented a respective chat window 220 which allows the external user to submit messages to the members of the group chat, which would be displayed in the messages window 202 of the GUI 200. In some embodiments, the messages sent by the external users are visible to the other external users. In other embodiments, messages sent by external users are not visible by other external users. Similarly, the input area 204 of the GUI 200 would send messages to the members of the group chat, and the three external users would not be able to view such messages in the respective GUI 200. However, messages sent via the input area 205 of the GUI 200 would be viewable by each of the three external users via their respective GUI 220. In at least one embodiment, the GUI 200 further provides the members of the group chat input areas to send messages the group as well as to one or more of the external users (e.g., send a message viewable by two of the three external users, but not the third external user).

Figure 3:
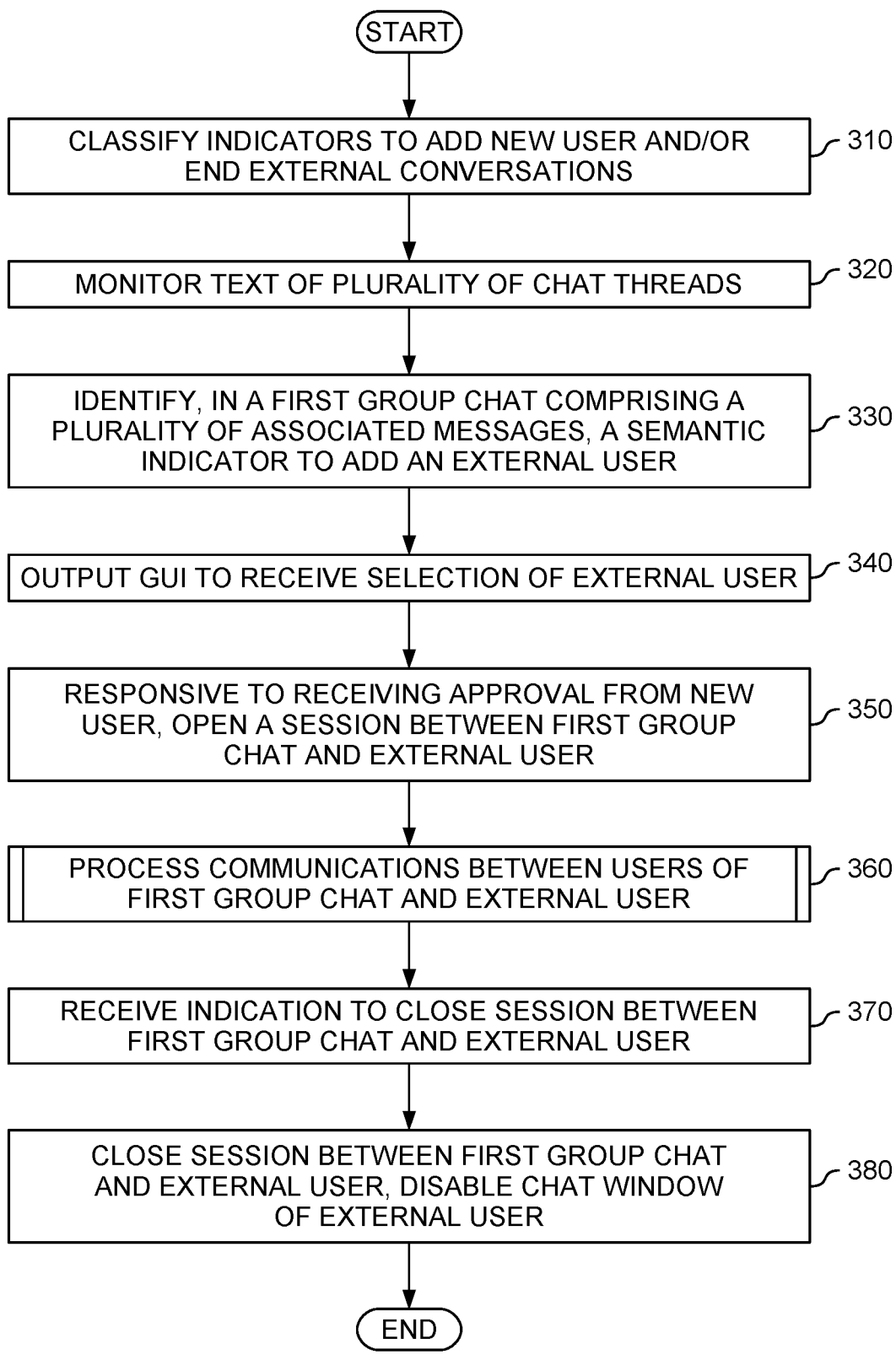
FIG. 3 is a flow chart illustrating an example method to provide enhanced group communications with external participants, according to one embodiment.

FIG. 3 is a flow chart illustrating an example method 300 to provide enhanced group communications with external participants, according to one embodiment. As shown, the method 300 begins at block 310, where the collaboration component 105 uses natural language classifiers applied to the text of the messages 104 to classify indications to add external users to group chats and/or to communications between group chats and external user(s). As previously stated, the rules 111 include predefined words, concepts, formatting, and/or phrases that indicate that an external user should be added to the group chat and/or that the group chat with the external user should be ended. For example, predefined phrases that indicate an external user should be added to the group chat include "I wonder if <name> knows," "let's ask," "we should get input from <name>" and the like. Similarly, predefined phrases that indicate the external conversation should be closed include "goodbye," "thank you," and the like. In addition, the collaboration component 105 builds on the predefined rules in the rules 111 and cognitively learns additional indicators at block 310 using natural language classifiers. For example, the collaboration component 105 may identify concepts and/or keywords that are consistently followed with a manual, user-initiated request to add an external user to a group chat. As such, the collaboration component 105 may classify such concepts and/or keywords as reflecting the need to invite an external user to the group chat. In at least one embodiment, the collaboration component 105 applies a threshold count of user-initiated requests to classify a given concept and/or keyword(s). For example, if the threshold is 10 user-initiated requests, and the keywords of "let's bring in" was followed by 20 user-initiated requests, the collaboration component 105 would classify the keywords of "let's bring in" as an indicator to add an external user to the group chat.

At block 320, the collaboration component 105 monitors each thread in the messages 104 that includes three or more members (e.g., a group chat). Generally, at block 320, the collaboration component 105 searches for concepts, phrases, and the like which indicate that an external user should be added to the group chat. At block 330, the collaboration component 105 identifies, in a first group chat comprising a plurality of associated messages, a semantic indicator to add an external user to the first group chat. The first group chat comprises a plurality of messages in the messages 104 that are associated by a common UUID and three or more user UUIDs. The semantic indicator is any text that has been classified as being associated with adding an external user to the group chat. For example, the collaboration component 105 may identify the phrase "let's ask Joel" in a message of the first group chat. In response, at block 340, the collaboration component 105 outputs a GUI, such as the GUI 210, to receive input specifying the external user(s) to add to the first group chat. As previously stated, however, in some embodiments, the collaboration component 105 outputs the GUI 210 based on a user request to add an external user to the first group chat.

At block 350, the collaboration component 105 opens a session between the first group chat and the external user. In at least one embodiment, the collaboration component 105 receives approval from the external user before opening the session. At block 360, described in greater detail with reference to FIG. 4, the collaboration component 105 processes communications between the members of the first group chat and the external user. Generally, the collaboration component 105 outputs messages sent by the external user to all members of the first group chat. The collaboration component 105 also outputs some input (e.g., input received via the input area 205) to all members of the first group chat and the external users. Additionally, the collaboration component 105 outputs some input (e.g., input received via the input area 204) only to the members of the first group chat, and not to any external users. At block 370, the collaboration component 105 receives an indication to close the session between the first group chat and the external user (e.g., a user selects the input button 208). In some embodiments, the collaboration component 105 identifies semantic indicators to close the session between the first group chat and the external user. For example, if the user "Tyler123" is the external user, and a member of the first group chat submits a message including "thanks for the help Tyler", the collaboration component 105 may determine that the session is complete, and programmatically determine to end the session. At block 380, the collaboration component 105 closes the session between the first group chat and the external user. Doing so disables the GUI 220 of the external users from submitting messages to the first group chat. Similarly, the collaboration component 105 removes the input areas 204, 205 from the GUI 200, and the first group chat members are able to communicate within the first group chat.

Figure 4:
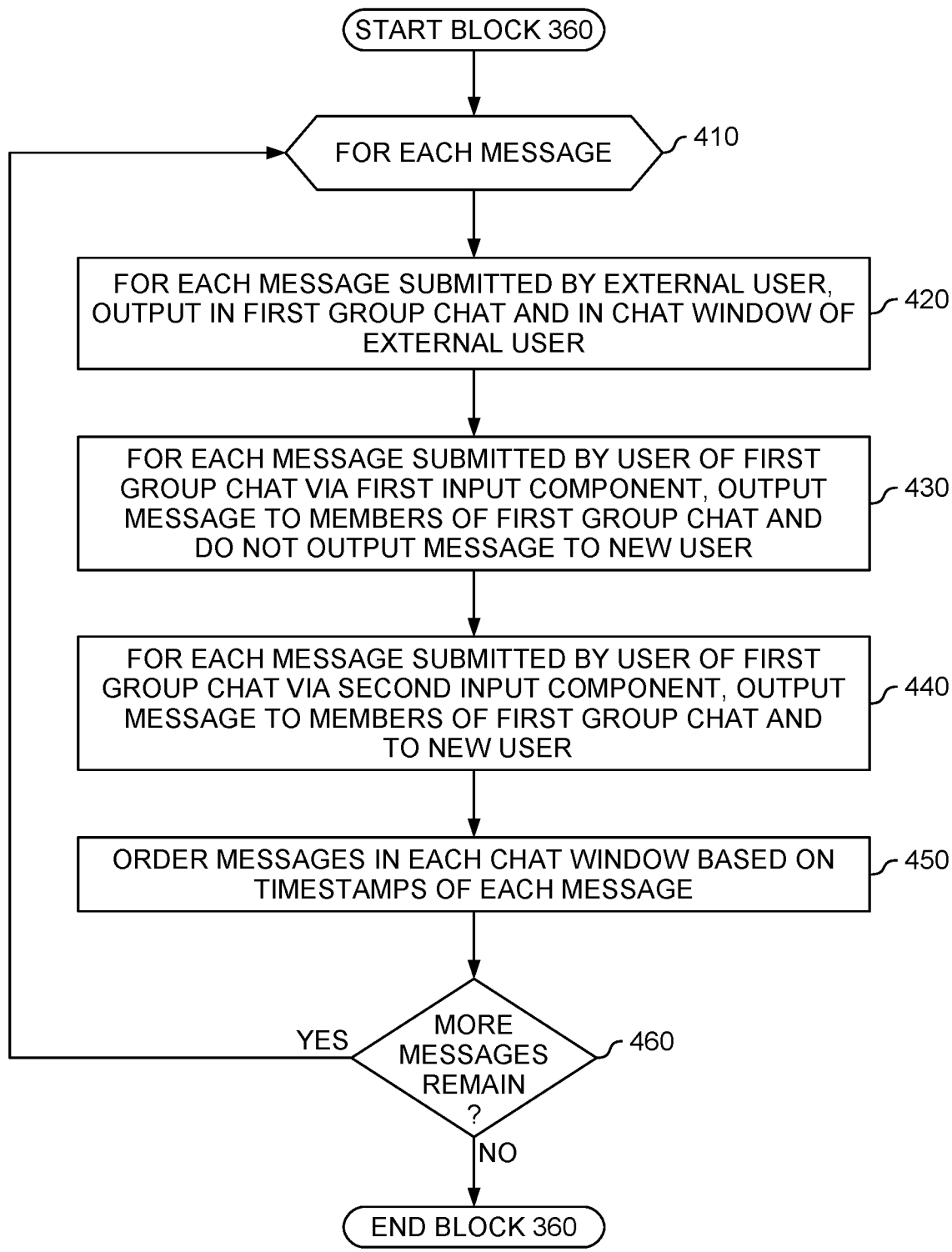
FIG. 4 is a flow chart illustrating an example method to process communications between users of a group chat and an external user, according to one embodiment.

FIG. 4 is a flow chart illustrating an example method 400 corresponding to block 360 to process communications between users of a group chat and an external user, according to one embodiment. As shown, the method 400 begins at block 410, where the collaboration component 105 executes a loop including blocks 420-460 for each message submitted by the members of the first group chat and/or the external users communicating with the members of the first group chat. At block 420, the collaboration component 105 outputs messages submitted by the users external to the group chat in the first group chat and in the chat window of the corresponding external user. Doing so allows the submitting user and the members of the first group chat to view the submitted messages.

At block 430, the collaboration component 105 outputs messages submitted via a first input area (e.g., the input area 204) by members of the first group chat to the other members of the first group chat. However, the collaboration component 105 does not output such messages to the users external to the group chat. At block 440, the collaboration component 105 outputs messages submitted via a second input area (e.g., the input area 205) to the members of the first group chat and to the users external to the group chat. Doing so allows all members of the first group chat and all external users to view messages. At block 450, the collaboration component 105 orders messages in each chat window based on the timestamp associated with each message. Generally, when a user submits a message to the first group chat, the collaboration component 105 and/or the communications applications 103 tag the message with metadata including a timestamp and group chat UUID. Doing so allows the messages to be outputted in the respective GUIs 200, 220 based on the timestamp.

Figure 5:
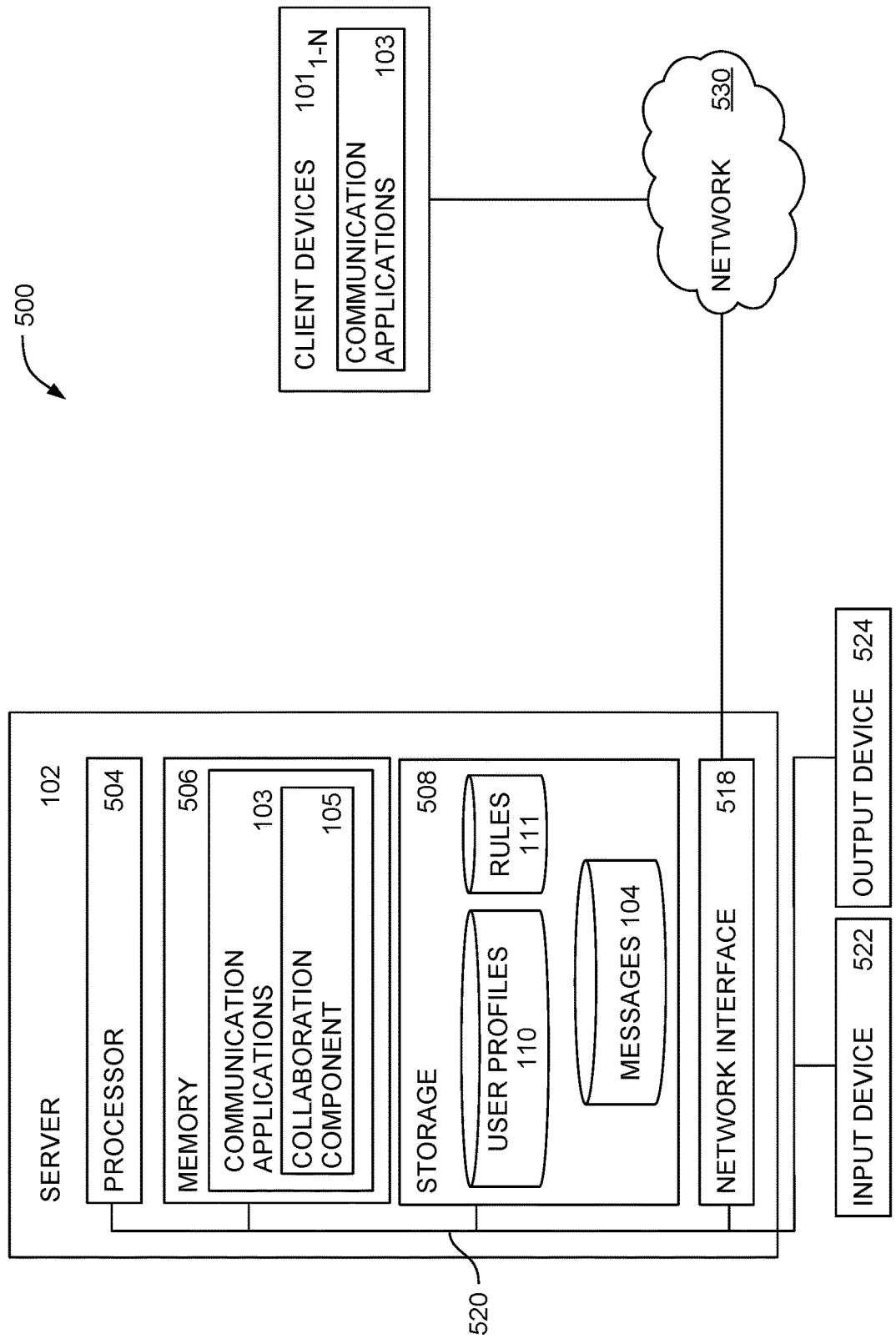
FIG. 5 illustrates a system which provides enhanced group communications with external participants, according to one embodiment.

FIG. 5 illustrates a system 500 which provides enhanced group communications with external participants, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the communication applications 103 and the collaboration component 105, while the storage 508 contains the messages 104, user profiles 110, and rules 111. As shown, the client devices $101_{1-N}$ include the communication applications 103 and a display device 513. The client devices $101_{1-N}$ further include processors, memory, storage, network interfaces, I/O devices, and a bus (each not pictured).

Advantageously, embodiments disclosed herein provide techniques to for enhanced group chats on messaging platforms. Generally, embodiments disclosed herein monitor messages submitted to a group chat, and detect indications to add an external user to the group chat. A communication channel between the group chat and the external user is established, allowing the external user to communicate with the group chat without needing to add the external user to the group chat or remove the external user from the group chat.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the foregoing aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the communications applications 103 including collaboration component 105 could execute on a computing system in the cloud and dynamically add external users to group chats. In such a case, the collaboration component 105 could classify indicators to add external users to group chats and store the indicators as rules in the rules 111 at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   receiving a first message from a member user in a group chat, wherein the member user is one of a plurality of member users participating in the group chat, wherein the group chat comprises a plurality of messages submitted prior to receiving the first message;
   identifying, in natural language text of the first message, a semantic indication to communicate with an external user who is not a member of the plurality of member users;
   identifying a plurality of candidate users based on the semantic indication;
   in response to receiving a selection of a first user of the plurality of candidate users as the external user from the member user, establishing communication between the external user and the group chat without adding the external user to the group chat;
   in response to receiving a second message from the external user, outputting the second message to each of the plurality of member users of the group chat; and
   in response to receiving a third message in the group chat from one member user of the plurality of member users, outputting the third message to the external user and to each of the plurality of member users of the group chat.

2. The method of claim 1, further comprising:
   transmitting the second message to a device associated with the external user; and
   transmitting the second message to a respective device associated with a respective member user of the plurality of member users of the group chat.

3. The method of claim 1, wherein a Graphical User Interface (GUI) provided to the plurality of member users comprises a first input area and a second input area, wherein the third message is received via the second input area of the GUI, the method further comprising:
responsive to receiving a fourth message from one member user of the plurality of member users via the first input area of the second GUI:
transmitting the fourth message for display via the second GUI on a respective device associated with the respective member user of the plurality of member users, wherein the fourth message is not viewable by the external user.

4. The method of claim 1, wherein identifying the semantic indication from the natural language text includes:
identifying a learned phase previously associated with adding external users to the group chat in the natural language text; and
identifying a name specified in the natural language text of the first message.

5. The method of claim 4, further comprising:
receiving selection of a second user of the plurality of candidate users as a second external user, wherein the second message is outputted to the second external user.

6. The method of claim 1, further comprising:
identifying, in a fourth message, a second semantic indication to end communications with the external user, wherein the fourth message is generated by one of: (i) the external user, and (ii) one of the plurality of member users; and
disabling a Graphical User Interface of the external user, thereby ending communications between the group chat and the external user.

7. The method of claim 1, wherein plurality of messages of the first group chat are associated with a first universally unique identifier (UUID), wherein the second and third messages are outputted based on a respective timestamp of each message.

8. A computer program product, comprising:
a computer-readable storage medium having computer readable program code embodied therewith, the computer readable program code executable by a processor to perform an operation comprising:
receiving a first message from a member user in a group chat, wherein the member user is one of a plurality of member users participating in the group chat, wherein the group chat comprises a plurality of messages submitted prior to receiving the first message;
identifying, in natural language text of the first message, a semantic indication to communicate with an external user who is not a member of the plurality of member users;
identifying a plurality of candidate users based on the semantic indication;
in response to receiving a selection of a first user of the plurality of candidate users as the external user from the member user, establishing communication between the external user and the group chat without adding the external user to the group chat;
in response to receiving a second message from the external user, outputting the second message to all of the plurality of member users of the group chat based on a status of the external user as external to the group chat; and
in response to receiving a third message from one member user of the plurality of member users, outputting the third message to the external user and to all of the plurality of member users of the group chat.

9. The computer program product of claim 8, the operation further comprising:
transmitting the second message to a device associated with the external user; and
outputting the second message to a respective device associated with a respective member user of the plurality of users of the group chat.

10. The computer program product of claim 8, wherein a Graphical User Interface (GUI) provided to the plurality of member users comprises a first input area and a second input area, wherein the third message is received via the second input area of the second GUI, the operation further comprising:
responsive to receiving a fourth message from one member user of the plurality of member users via the first input area of the second GUI:
transmitting the fourth message for display via the second GUI on a respective device associated with the respective member user of the plurality of member users, wherein the fourth message is not viewable by the external user.

11. The computer program product of claim 8, wherein identifying the semantic indication from the natural language text includes:
identifying a learned phrase previously associated with adding external users to the group chat in the natural language text; and
identifying a name specified in the natural language text of the first message.

12. The computer program product of claim 11, the operation further comprising:
receiving selection of a second user of the plurality of candidate users as a second external user, wherein the second message is outputted to the second external user.

13. The computer program product of claim 8, the operation further comprising:
identifying, in a fourth message, a second semantic indication to end communications with the external user, wherein the fourth message is generated by one of: (i) the external user, and (ii) one of the plurality of member users; and
disabling a Graphical User Interface of the external user, thereby ending communications between the group chat and the external user.

14. The computer program product of claim 8, wherein the plurality of messages of the group chat are associated with a first universally unique identifier (UUID), wherein the second and third messages are outputted based on a respective timestamp of each message.

15. A method comprising:
receiving a first message in a first group chat, wherein a first plurality of users are participating in the first group chat;
in response to receiving the first message:
identifying, in natural language text of the first message, a semantic indication to communicate with an external user that is not part of the first plurality of users; and
creating a second group chat that includes the external user and the first plurality of users; and
associating the first group chat with the second group chat, such that the external user is excluded form the first group chat but is enabled to communicate with the first plurality of users in the first group chat:
wherein a second message received in the second group chat from the external user is output to all of the plurality of user in the first group chat and output to all of the plurality of member users and the external user in the second group chat; and wherein a third message received in the first gorup chat form a given user of the first plurality of users is output to all of the plurality of member users of in the first group chat and is selectively output to the second group chat.

16. The method of claim 15, wherein the third message is selectively output to the second group chat based on a Graphical User Interface (GUI) feature user by the given user to submit the third message.

17. The method of claim 15, wherein the first group chat is associated with a first universally unique identifier (UUID), and wherein the seocnd group chat is associated with a second UUID.

18. the method of claim 17, wherein the first message is output in the first gorup chat and the second group chat based on a first timestamp with the first UUID and the second UUID, wherein the second message is output in the first group chat and the second group chat based on a second timestamp with the first UUID and the second UUID, and wherein the third message is output in the first group chat and the second group chat based on a third timestamp with the first UUID and the second UUID when selectively output to the second group chat.

19. The method of claim 17, wherein the first message is output in the first group chat and the second group chat based on a first timestamp with the first UUID and the second UUID, wherein the second message is output in the first group chat and the second group chat based on a second timestamp with the first UUID and the second UUID, and wherein the third message is output solely in the first group chat based on a third timestamp with only the first UUID when selectively not output to the second group chat.

20. The method of claim 15, further comprising:
receiving a fourth message in at least one of the first group chat and the second group chat; and
in response to identifying a second semantic indication in natural language text of the fourth message to end communication with the external user, terminating the second group chat.

* * * * *

UNITED STATES PATENT AND TRADEMARK OFFICE
CERTIFICATE OF CORRECTION

PATENT NO.         : 10,812,539 B2                                       Page 1 of 1
APPLICATION NO.    : 15/618948
DATED              : October 20, 2020
INVENTOR(S)        : Ye Qing Chen et al.

It is certified that error appears in the above-identified patent and that said Letters Patent is hereby corrected as shown below:

On the Title Page

Item (72), in Column 1, in "Inventor", Line 1, delete "Ye Qing Chen," and insert -- Chen Ye Qing, --, therefor.

Signed and Sealed this
Eighth Day of December, 2020

Andrei Iancu
*Director of the United States Patent and Trademark Office*